July 31, 1956 W. D. HOUGHTON 2,757,227

COLOR TELEVISION SYSTEM

Filed April 20, 1950 4 Sheets-Sheet 1

INVENTOR
William D. Houghton
BY
ATTORNEY

July 31, 1956 W. D. HOUGHTON 2,757,227

COLOR TELEVISION SYSTEM

Filed April 20, 1950 4 Sheets-Sheet 2

INVENTOR
William D. Houghton
BY
[signature]
ATTORNEY

July 31, 1956 W. D. HOUGHTON 2,757,227

COLOR TELEVISION SYSTEM

Filed April 20, 1950 4 Sheets-Sheet 3

INVENTOR
William D. Houghton
BY
[signature]
ATTORNEY

July 31, 1956 W. D. HOUGHTON 2,757,227

COLOR TELEVISION SYSTEM

Filed April 20, 1950 4 Sheets-Sheet 4

INVENTOR
William D. Houghton
BY
Olin R. Mitchell
ATTORNEY

United States Patent Office 2,757,227
Patented July 31, 1956

2,757,227

COLOR TELEVISION SYSTEM

William D. Houghton, Princeton, N. J., assignor to Radio Corporation of America, a corporation of Delaware Application April 20, 1950, Serial No. 157,148

15 Claims. (Cl. 178—5.2)

This invention relates to multi-channel signalling systems of the time division multiplex type. Though not necessarily exclusively limited thereto, the invention relates, in one aspect thereof, particularly to multiplex signal generation and sampling in a color television system.

One of the presently-used color television systems operates according to the dot or elemental multiplex principle. A typical embodiment of such a system is shown in copending U. S. application of John Evans, Serial No. 111,384, filed August 20, 1949, and titled "Color Television." According to this principle, the color information of each of a multiplicity of elemental image areas is represented by a group of successive video signals. The color-representative video signals of each elemental image area are transmitted and received successively. In this process, it is necessary to produce a composite video signal wave which has instantaneous amplitudes, at successive time-spaced intervals which are representative respectively of the component colors of successive elemental image areas. In order to reproduce an image from such video signals, it is necessary to sample the wave at times corresponding to each of the predetermined time spaced intervals. The video signal information thus derived is used to excite the image reproducing apparatus to produce light of the different component image colors.

Originally, the sampling of the composite video signal wave was done at an early stage in the receiver. At such a stage the signal level is relatively low. Hence, such an arrangement was called a low level sampling system. It since has been determined that successful sampling of the received video signal wave may be accomplished at relatively high signal levels. Such a practice may be followed without encountering any substantial diminution of the light derived from the image reproducing apparatus or without adversely affecting the color separation. In either high or low level sampling systems, a judicial choice of parameters will produce a highly effective cross talk balance. In other words, the cross talk which might be expected to be produced by taking samples of the composite video signal wave is effectively balanced out so that it does not appear in the finally produced signal to cause color dilution.

Presently, high level video signal sampling is preferred. One reason for this preference is the apparatus simplification which is made possible. Also, since only one video signal amplifying channel is required, uniform amplification of all color video signals is effected.

One high level video signal wave sampling arrangement is covered in the copending U. S. application of George C. Sziklai, Serial No. 145,420, filed February 21, 1950, and titled "Color Television Receiving System," now Patent No. 2,725,418, granted November 29, 1955. In this application the video signal wave is impressed continuously, after suitable amplification thereof, upon one electron beam intensity control electrode of a cathode ray image reproducing tube. The electron beam is keyed on and off at the signal sampling frequency by means of pulses impressed upon the other beam intensity control electrode. The beam keying is effected synchronously with the reception of the different color video signal components.

Irrespective of whether the sampling of the video signal wave is effected at low or high signal levels, it is necessary that objectionable cross talk between the signals representative of the different image colors be prevented. In a three color system, such as is most commonly used, the composite video signal wave may be developed from the individual color video signals so that the individual signals are spaced or timed relative to one another approximately 120 electrical degrees at the sampling frequency. It has been demonstrated that the individual component color video signal waves may be so related relative to one another that, when one of the waves is at a maximum or peak value, the other two waves have substantially zero values.

Such a relationship is disclosed in a copending U. S. application of Clarence W. Hansell, Serial No. 124,034, filed October 28, 1949, and titled "Color Transmission System." The described amplitude and phase relationship of each of the component color video signal waves to prevent cross talk is obtained, according to the teachings of the Hansell case, by making the amplitude of a high frequency sub-carrier wave equal substantially to twice the amplitude of the video signal. A resultant wave for each color video signal is produced in this manner. When a composite video signal wave formed of such resultant waves is sampled at times corresponding to the peaks of the individual resultant waves, the other two resultant waves have substantially zero amplitudes.

The present invention provides a time division multiplex system particularly suited for color television. Such a system is provided with improved signal generating and signal sampling facilities substantially of the same general character as the signal generating system covered by the Hansell application and signal sampling apparatus of the Sziklai application, both previously referred to.

An object of the present invention, therefore, is to provide a time division multiplex signalling system having improved signal generating and signal sampling arrangements whereby to operate more efficiently.

Another object of the invention is to provide an improved time division multiplex system especially adapted for color television, wherein the generation of a composite video signal wave is of such a character to provide automatically an effective cross talk balance whereby to facilitate signal sampling.

Still another object of the present invention is to provide an improved system for exciting the different color elements of an image reproducing means in synchronism with the reception of the corresponding color-representative video signals.

A further object of the invention is to provide improved apparatus for effecting high level sampling of a video signal wave in an elemental multiplex color television system.

In general, high level video signal sampling is effected by impressing the composite video signal wave continuously upon one of the electron beam intensity control electrodes of one or a plurality of color kinescopes. Color keying devices suitably energize the other electron beam intensity control electrodes to render effective the electron beams only at those times when the proper color video signal is being received.

Apparatus according to the present invention is especially designed for operating a plurality of color kinescopes. It will be evident, however, that with suitable modifications, for example, of the type suggested in the copending Sziklai application referred to, this invention may be adapted for use with a single multi-color kinescope having one or more electron beams. According to one of the features of this invention, there is provided means whereby the color kinescope may be automatically conditioned for either black and white or color image reproduction. This is accomplished by the present invention principally by means of the self-biasing circuits of the keying tubes together with the means for supplying space current to these tubes.

Cross talk balance is accomplished in accordance with the present invention by adjusting the direct current component of the video signal samples. The adjustment is made by controlling the width or time duration of the samples. When the samples are passed through a low pass filter having a cutoff below the second harmonic of the sampling frequency, a sine wave is produced which has a maximum and two zero values occurring sequentially at 120 degree phase intervals at the sampling frequency.

The novel features that are considered characteristic of this invention are set forth with particularity in the appended claims. The invention itself, however, both as to its organization and method of operation as well as additional objects and advantages thereof will best be understood from the following description taken in connection with the accompanying drawings.

Figures 1, 2, 3, 4:
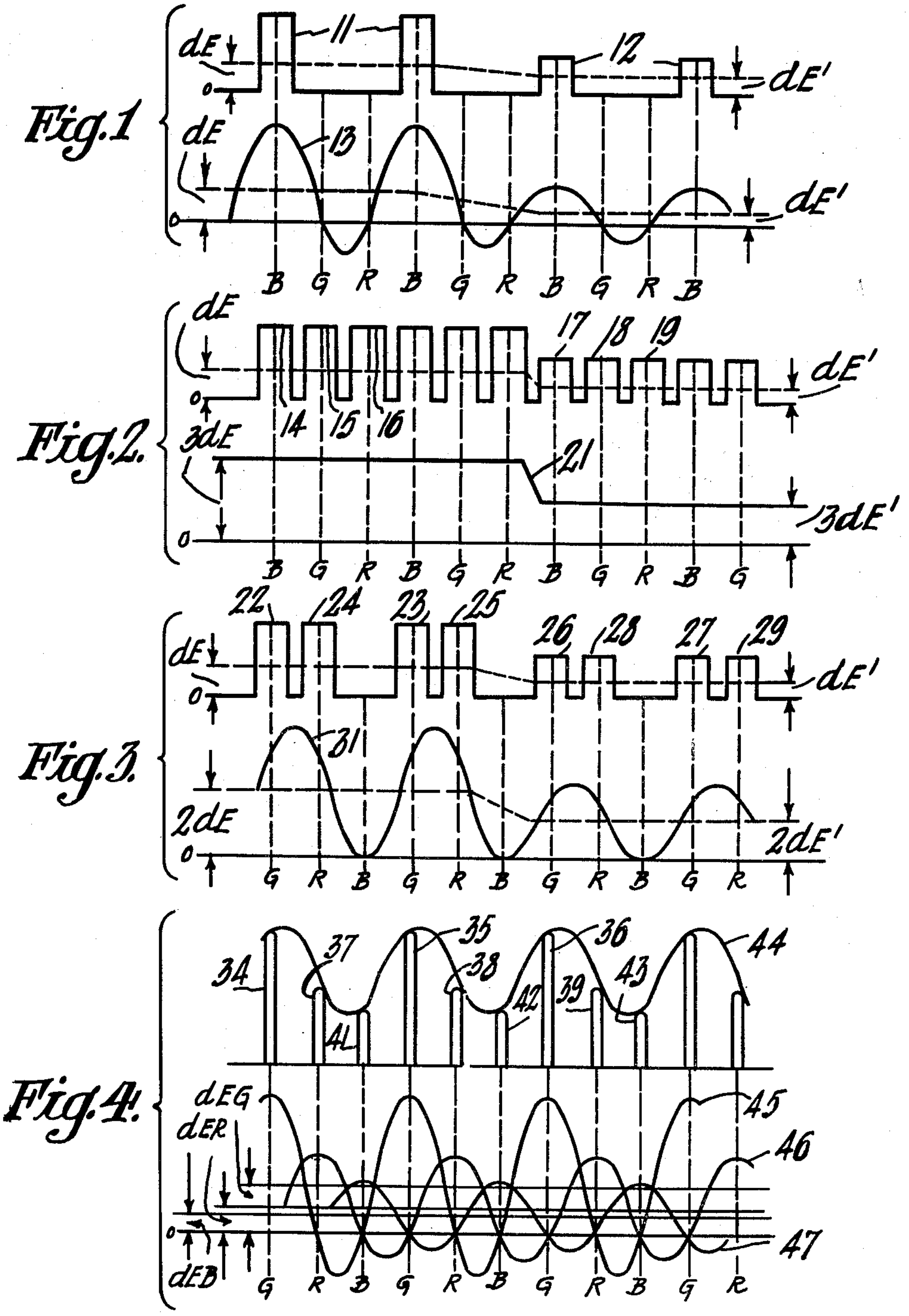
Figures 1 through 5 are curves showing waveforms referred to in explaining the operation of the sampling system.

In order to more fully appreciate the manner in which sampling of a composite color television video signal wave may be effected without sacrificing either picture brightness or good color separation, consideration first will be given to the character of the composite video signal wave and the manner in which it is developed and subsequently sampled in accordance with this invention. It will be understood that the transmitting apparatus may include a television camera or pickup tube for each of the colors in which the image is to be reproduced. Typical transmitting station apparatus will be described in detail later. In the present case, it will be assumed that the system is a three-color one in which the image is to be reproduced in red, green and blue colors, for example. The different color components of the television subject are separated by means such as dichroic mirrors or the like and projected respectively upon the three pickup tubes. The tubes, for example, may be image-orthicons which function independently of one another to develop video signals representative of the three colors. Each of these signals is independently amplified and impressed upon a sampling unit. The transmitter sampler operates to derive samples from each of the three video signals successively. As a result, each of the video signals is converted into a series or train of amplitude-modulated pulses. The pulses representative of the three colors are combined so that every third pulse is a sample from the video signal of a given color.

The three series of pulses then are combined with the conventional synchronizing and blanking pulses to form a complete color television signal. This signal is passed through a low pass filter having a frequency cutoff which is only slightly higher than the video signal sampling frequency. Accordingly, the higher order frequency components of the pulses are attenuated so that the signals derived from the low pass filters are substantially sinusoidal in form and have a frequency substantially equal to the sampling frequency. The composite waveform derived from the filter consists of the three individual sine waves derived from the respective series of pulses but displaced in phase relative to one another by 120 electrical degrees. The composite video signal wave is employed to modulate a carrier wave in the usual manner for transmission to a receiving point.

At the receiver, the composite video signal wave is recovered from the carrier in the usual manner. In order to reproduce a color television image from such a signal wave, it is necessary that it be sampled at times corresponding to the occurrence of the pulses of the different trains produced at the transmitting station. It will be appreciated that, since the composite video signal wave includes three sinusoidal waves representing the three colors respectively, it is necessary to sample this composite wave in such a manner that the desired color signal is derived exclusively of any other color signals. Originally, in order to minimize cross talk between the different color signals, relatively small samples were taken of the composite video signal wave at low signal level stages of the receiver. When the signal samples had been suitably amplified for impression upon the color kinescopes, the time duration of the samples would have been extended by reason of the normal operation of the signal amplifiers in failing to abruptly cutoff at the limits of the frequency pass bands thereof. In this way, it was possible to secure both good color separation and high light intensity.

However, it has been found that sampling of the composite video signal wave may be effected at high levels without encountering objectionable cross talk or sacrificing light intensity. Consequently, in the present case, the signal sampling is accomplished at a high signal level such as directly at the kinescopes, for example.

To understand the operation of a high level sampling receiver; particular reference will now be made to Figures 1 to 5 of the drawings. These figures illustrate how a composite color video signal wave may be produced by the multiplexing process so that, subsequently, it may be sampled at any level in such a manner that a good cross talk balance may be achieved.

Particular reference will first be made to Figure 1. In one extreme condition, it is assumed that the picture contains only a blue color component which varies in intensity in different parts of the picture. The train of pulses 11 and 12 are those produced by the blue color sampler. This figure also indicates by the letters "B," "G" and "R" the timing of the sampling apparatus. These sampling events occur substantially at 120 degree intervals at the sampling frequency. At times "B" the blue sampling apparatus is operative. Similarly, at times "G" and "R" the green and red samplers are operative. Accordingly, in Figure 1, it is seen that, in the time between the occurrence of the blue pulses, no other pulses representative of green and/or red components are produced.

The blue pulses 11 and 12 are passed through a low pass filter having a cutoff frequency which is slightly higher than the fundamental, but materially lower than the second harmonic of the sampling frequency. There is derived from the filter a substantially sinusoidal wave such as the wave 13. This wave has a frequency which is equal to the sampling frequency.

Since the pulses 11 and 12 are unidirectional in character, they are made up of a direct current component "$dE$," a fundamental frequency alternating current component which is equal to the pulse repetition rate, and a comparatively large number of harmonics thereof. In passing through the low pass filter, the harmonics are effectively attenuated so that only the fundamental wave such as represented by the curve 13 is produced in the output circuit. It is seen that the sine wave 13 has an alternating current axis which is displaced above the zero axis by an amount equal substantially to the direct current component *d*E.

The key to the achievement of good cross talk balance in a time division multiplex system of this character is in producing the proper direct current component of the different color video signal waves. With reference to the pulses 11 and 12 of Figure 1, it is seen that the direct current component *d*E is dependent upon the amplitude, width and repetition rate of the pulses. The amplitude of the pulses, of course, is dependent upon the color values of the television image. It has been found that by properly controlling the time duration or width of the pulses occurring at a particular frequency, the direct current component *d*E may be made of such a value that the sine wave 13 always has a substantially zero value at the green and red sampling times "G" and "R" and a maximum value at the blue sampling times "B."

By fixing the width of the pulses at such a value, variations in the pulse amplitude in accordance with the picture values effect variations in the direct current component and the amplitude of the sinusoidal component so that, irrespective of instantaneous pulse amplitude, the blue video signal sine wave always has a substantially zero value at the green and red sampling times. Figure 1 illustrates that the pulses 12 are of somewhat lower amplitude than the pulses 11. The direct current component represented at "*d*E′," accordingly, is smaller in magnitude than the direct current component "*d*E" of the pulses 11. Similarly, the sine wave 13 has a smaller amplitude and a direct current component of suitable value to insure that the wave has zero values at the green and red sampling times.

In Figure 2, another extreme condition is analyzed. It is assumed that the television picture includes blue, green and red color components which are all of equal intensities, varying similarly in different parts of the picture. These conditions are typical for black and white television systems. Blue, green and red pulses 14, 15 and 16, respectively, are shown of relatively large amplitude and blue, green and red pulses 17, 18 and 19 are of somewhat smaller amplitude. In a manner similar to that described with reference to Figure 1, the direct current component of each series of color pulses is represented at *d*E for the large amplitude pulses and at *d*E′ for the smaller amplitude pulses. It is seen that the fundamental frequency of all of the pulses combined is three times that of the pulses for a single color. Also, since the low pass filter is designed to attenuate all frequencies materially higher than the fundamental frequency at which a single color video signal is sampled, it is seen that the alternating current component of the wave 21 derived from the filter output will be zero. However, there will be present in the filter output circuit a direct current component which has three times the magnitude of the direct current component due to any one series of pulses representing a single color. The direct current component derived from the filter is indicated in Figure 2 as equal to 3*d*E for the large amplitude pulses and 3*d*E′ for the small amplitude pulses.

It is seen that, when the wave 21 is sampled at a receiver, the samples for the various colors will be of equal amplitude which is comparable to operation in a black and white system. In other words, the direct current component represented by the curve 21 varies in amplitude in accordance with the signal modulation, thereby enabling production of a conventional black and white image.

In order to more completely understand the operation of the present system in effecting good cross talk balance, reference now will be made to Figure 3. A condition intermediate of the previously described limiting conditions is assumed, such as when one of the colors is completely lacking in the picture. Figure 3 will be described on the assumption that blue is lacking in the television picture. The pulses 22 and 23 represent the green samples at relatively high light intensity. The pulses 24 and 25 represent the red samples at a high light level. Similarly, the pulses 26—27 and 28—29 represent, respectively, green and red samples at a somewhat lower light intensity. As in the previously described Figures 1 and 2, the direct current component resulting from a single series of either the red or green pulses is represented at *d*E for the high level pulses and at *d*E′ for the low level pulses.

After passing these pulses through the low pass filter, there is derived from the output circuit of the filter a sinusoidal wave 31. This wave varies in amplitude in accordance with the amplitude of the pulses from which it is developed. The direct current component of the wave 31 also will be noted to be substantially equal to twice the direct current component of a single one of the groups of pulses. It is to be especially noted in this figure that the wave 31 is shifted in phase in such a manner that the green and red samples and the corresponding instantaneous amplitudes of the composite video signal wave 31 are displaced equally on different sides of each of the positive peaks. Accordingly, they are substantially equal in voltage amplitude. Furthermore, it will be noted that the amplitude of the wave 31 is zero at the blue sampling times. Consequently, it will be seen that, when the wave 31 is sampled at the receiver, there will be derived therefrom substantially equal green and red samples and nothing will be derived therefrom representative of the blue component.

It will be appreciated that, in actual practice, many different modifications of these typical examples chosen for purposes of illustration will be produced. However, it will be understood that all possible arrangements adhere to the same underlying principles of operation. To illustrate just one additional arrangement, reference will be made to Figure 4. It is assumed that, in a particular portion of the picture, there is considerable green, a moderate amount of red and a small amount of blue color present. The pulses 34, 35 and 36 represent the green samples, the pulses 37, 38 and 39, the red and the pulses 41, 42 and 43 represent the blue samples. After passing these different color signal samples through the low pass filter, there is derived a composite video signal wave 44. It will be understood that this composite wave 44 consists respectively of green, red and blue waves 45, 46 and 47.

In view of the foregoing description, it is seen that the direct current component of the green video signal wave 45 is represented at "*d*EG." In a similar manner, the direct current component of the red video wave 46 is represented at *d*ER, and *d*EB represents the direct current component of the blue wave 47. An inspection of the waves 45, 46 and 47 shows the manner in which the proper selection of the direct current component of these waves enables the system to effect a good cross talk balance. For example, it may be seen that, at any of the green sampling times, the green wave 45 has a maximum amplitude. At the same time, the red and blue waves 46 and 47 have zero amplitudes. The same conditions exist at any of the red and blue sampling times.

From the foregoing analysis, it will be seen that, by making the sampling pulses of relatively short time duration, by properly timing them relative to the composite video signal wave, and by converting them to a fundamental frequency sine wave, automatic cross talk balance or rejection is obtained. For a given repetition rate of the sampling pulses, it is necessary that the width or time duration thereof be suitably adjusted to give the desired direct current component to the sinusoidal waves of the video signal. The sine wave which is developed at the filter output is seen to have the same peak-to-peak amplitude irrespective of whether one or two pulses of equal amplitude are applied to the filter input circuit. The direct current component varies directly with the number of pulses. It also is seen that the phasing or timing of the sine wave which is developed from two series of pulses is changed with respect to that developed from one series of pulses.

While it may appear from the foregoing analysis that complete cross talk rejection may be obtained only instantaneously at times when the wave to be sampled has a peak value and the other waves have zero amplitudes, it is to be understood that successful sampling of such a video signal wave at a receiver may be effected by taking samples of a magnitude as great as 30 degrees at the sampling frequency.

Figures 5, 8, 9:
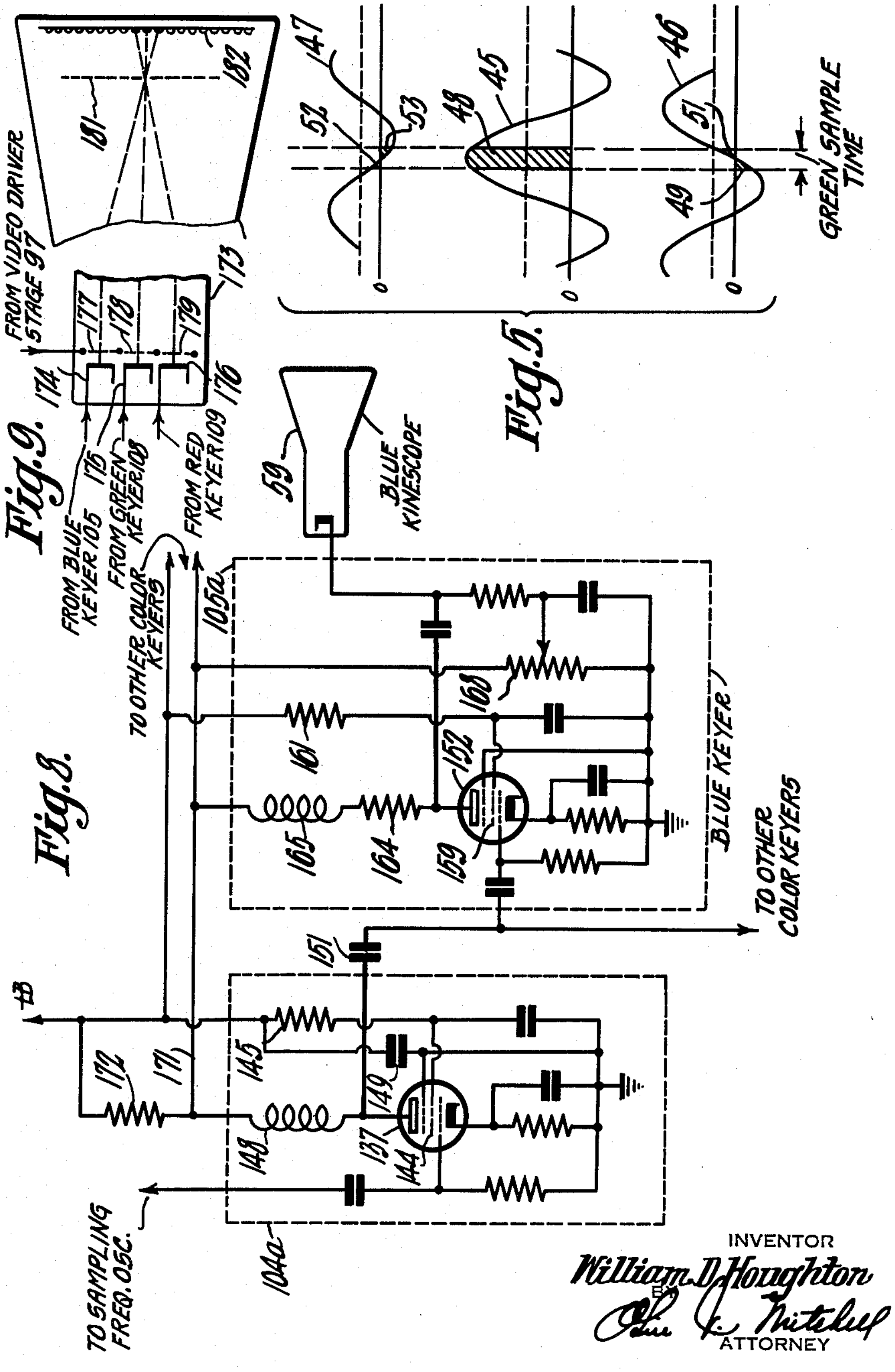
Figure 8 is a fragmentary circuit diagram of a typical keying circuit embodying facilities according to the present invention for effecting automatic operation of the apparatus for reproducing either black and white or color images.
Figure 9 is a fragmentary view of a single multi-color kinescope as used in conjunction with an embodiment of the invention.

By referring now to Figure 5 of the drawings it will be shown that samples of this magnitude are capable of producing substantially undiluted color signals. In Figure 5, there are reproduced portions of the green, red and blue waves 45, 46 and 47, respectively, of Figure 4, as described, these waves are the components of the composite wave 44. It is assumed that a green sample is to be extracted from the wave 44. The width of the sample, in accordance with presently preferred practice, is approximately 30 electrical degrees at the sampling frequency. The green sample is represented by the hatched area 48 under the curve 45. It will be seen that, during the green sampling time, the red video signal wave 46 is changing from a relatively small negative value through zero to a positive value. Consequently, a sample is taken of this wave. It will be seen, however, that the sample consists of a negative portion 49 and a positive portion 51. Except for small deviations in the shape of the wave 46 in this region below and above the zero line, it will be seen that the negative and positive portions 49 and 51, respectively, are substantially equal and effectively balance one another so that the net effect is substantially zero. Likewise, it will be seen that, during the green sampling time, the blue video signal wave 47 also is sampled. Consequently, there are produced positive and negative samples 52 and 53, respectively, which are of substantially equal magnitude, thereby balancing one another to produce a zero net effect.

Figure 6:
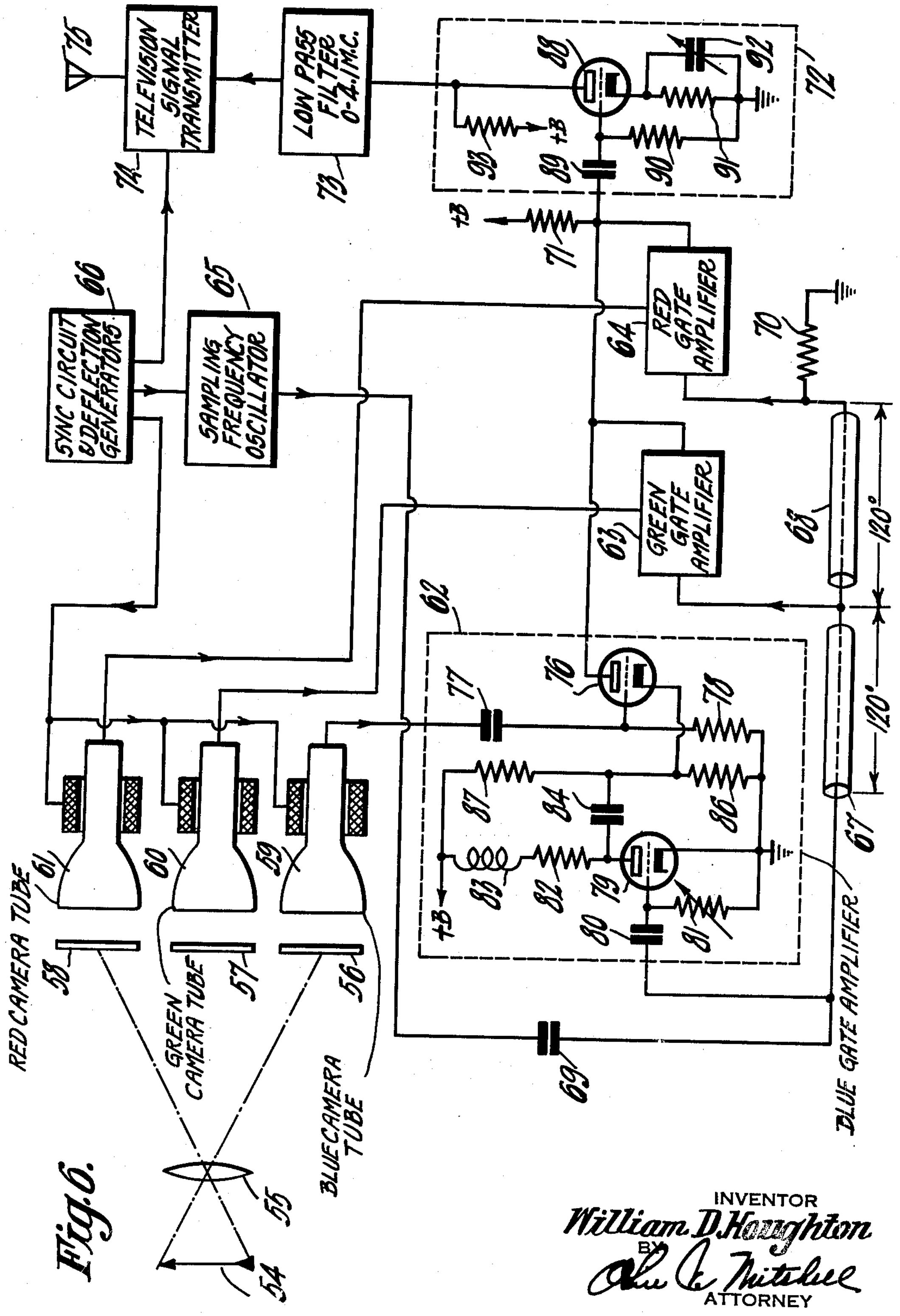
Figure 6 is a circuit diagram of a television transmitter showing a typical embodiment of video signal generating apparatus by which to obtain automatic cross-talk balance in accordance with this invention.

Referring now to Figure 6 of the drawings, there is shown color television video signal-generating and transmitting apparatus embodying one of the features of this invention. Differently colored light which is reflected from an object 54 is projected by a suitable optical system represented by the lens 55 upon the color television camera equipment. The light from the object is separated into its primary component colors by suitable means such as blue, green and red filters 56, 57 and 58. The light which is permitted to pass through each of the filters is directed onto the photosensitive electrodes of the blue, green and red camera tubes 59, 60 and 61 respectively. These tubes may be conventional camera tubes such as image-orthicons or the like. In any case, they must be capable of response to the differently colored light projected respectively thereon.

The video signals derived from the respective camera tubes are representative of the blue, green and red components of the television subject. These video signals are developed substantially concurrently. In order that they may be transmitted on a time division multiplex basis in accordance with the system disclosed in the copending Evans application referred to, there are provided blue, green and red gate amplifiers 62, 63 and 64 respectively. These devices function to sample the differently colored video signals derived from the camera tubes. The gate amplifiers preferably all are of the same character. Accordingly, the details of only the blue gate amplifier 62 are shown and described herein. It will be understood that the green and red gate amplifiers 63 and 64 may be substantially identical to the blue gate amplifier.

The sequential operation of the gate amplifiers is controlled by a wave derived from a sampling frequency oscillator 65. This oscillator may be any conventional apparatus for producing a relatively high frequency sine wave. Its essential requirements are that it be stable in its output frequency and also subject to control by means of periodic pulses. A typical form of oscillator suitable for this purpose is shown in the book entitled "Wave Forms," published by McGraw-Hill Book Co., Inc., at page 143, with particular reference to Figure 4–45. The frequency of the oscillator 65 is controlled by conventional synchronizing circuit and deflection generating apparatus 66. The particular means of such control forms no part of the invention. As disclosed in the copending Evans application referred to the control pulses for the oscillator 65 may be the horizontal or line synchronizing pulses. Alternatively, a short burst of alternating current at the sampling frequency occurring during the horizontal blanking periods may be used for this control. This latter type of control system is disclosed in a copending U. S. application of A. V. Bedford, Serial No. 143,800, filed February 11, 1950, and titled "Synchronizing Apparatus," now Patent No. 2,728,812, granted December 27, 1955.

The sinusoidal output wave derived from the oscillator 65 is impressed at 120 electrical degree intervals upon the blue, green and red gate amplifiers 62, 63 and 64 respectively. The different phase relationships are determined by delay network formed of a pair of serially connected transmission lines 67 and 68. One terminal of the network is coupled to the oscillator 65 by a capacitor 69. The other terminal of the network is connected to ground through a resistor 70 having a value equal substantially to the characteristic impedance of the transmission lines. By this means, reflections in a reverse direction over the lines 67 and 68 are prevented. The ungrounded terminal of the delay network is coupled to the blue gate amplifier 62. Each of the lines 67 and 68 has a length sufficient to produce a time delay or phase change of substantially 120 electrical degrees at the sampling frequency. Accordingly, the junction point between the lines is coupled to the green gate amplifier 63, thereby delaying its operation by 120 degrees relative to the operating time of the blue gate amplifier 62. Similarly, the remote or grounded terminal of the delay network is coupled to the red gate amplifier 64. Hence, its operation is delayed 120 degrees relative to the operating time of the green gate amplifier 63 or 240 degrees relative to the operating time of the blue gate amplifier 62.

The output circuits of the blue, green and red gate amplifiers 62, 63 and 64 are connected together as shown and to a source of positive voltage indicated at +B through a load resistor 71. The combined output circuits of the gate amplifiers are coupled to a signal adder stage 72. The output circuit of the adder is coupled to a low pass filter 73 capable of attenuating all frequencies substantially higher than the fundamental of the sampling frequency. The output of the low pass filter is coupled to a conventional television signal transmitter 74 for the development of a composite television signal by which to modulate a carrier wave which in turn may be radiated by an antenna 75.

The synchronizing circuit and deflection generating equipment 66 is coupled to the television signal transmitter 74 as shown in a conventional manner for the usual development of the composite television signal. The deflection generating apparatus also is coupled to the deflection apparatus associated with the camera tubes 59, 60 and 61. In this manner, the scanning operation of the three camera tubes may be concurrently controlled.

The blue video signals derived from the camera tube 59 are impressed upon the blue gate amplifier electron tube 76 by means of a coupling which includes a capacitor 77 and a grid leak resistor 78. The tube 76 normally is biased to a non-conducting state. This tube is controlled by a driver electron tube 79. The in-phase sampling frequency oscillation derived from the oscillator 65 is coupled to the control grid of the driver tube 79 by a capacitor 80 with which is associated a grid leak resistor 81. Preferably, this resistor is made adjustable as shown. The cathode of the tube is directly grounded. The output circuit of the tube derived from the anode thereof includes a resistor 82 and a series-connected inductor or coil 83 coupled to a source of positive voltage indicated as +B. The coil 83 functions to suitably shape the form of the pulses developed at the anode of the driver tube 79.

The anode of the driver tube is coupled by a capacitor 84 to the cathode of the gate tube 76. The cathode of this tube is grounded through a resistor 86 and also is coupled to a suitable source of positive voltage such as indicated at +B through a resistor 87. By this means the tube 76 is biased so that normally it is non-conductive.

Normally, the tube 79 also is biased to its non-conducting state. The tube 79 is rendered conducting periodically by pulses derived from the sampling frequency oscillator 65. Accordingly, pulses of negative polarity are developed at the anode of this tube and are impressed upon the cathode of the gate tube 76. This tube, accordingly, is rendered conducting for a short interval of time to reproduce in its anode or output circuit a signal corresponding to the blue video signal derived from the camera tube 59 at that time. The amplitude of the pulses developed in the output circuit of the gate tube 76 depends upon the amplitude of the video signal as previously described.

The width of the pulse developed in the output circuit of the tube 76 may be varied by a suitable adjustment of the driver tube grid leak resistor 81. By this means, the direct current component of the blue video signal samples may be properly set for effective cross talk balancing purposes as previously described.

Inasmuch as no two of the gate amplifiers 62, 63 and 64 are operative at the same time, the output circuits thereof may be combined through a common load impedance such as the resistor 71. Accordingly, there will be developed across this resistor three series of pulses derived respectively from the three gate amplifiers. These three series of pulses, which may correspond to the pulses shown in Figure 4, are impressed upon the adder apparatus 72.

This apparatus consists essentially of an electron tube 88 having a control grid which is coupled by a capacitor 89 to the combined output circuit of the gate amplifiers. A grid leak resistor 90 is included in the coupling circuit. The cathode of the tube is connected to ground through a self-biasing network including a resistor 91 and a bypass capacitor 92. Preferably, the capacitor 92 is made variable. By such means, the amplification of the video signal samples may be adjusted to provide the desired relationship to the direct current components as previously described. Space current for the tube 88 is derived from a suitable power supply indicated as +B which is connected to the anode of the tube through a load resistor 93. The video signal adder 72 functions to amplify the combined outputs of the gate amplifiers 62, 63 and 64 and also serves as a buffer stage between the low pass filter and the gate amplifiers.

The low pass filter 73 functions as described to convert the pulse samples into substantially sinusoidal waves at the sampling frequency. These component waves then are combined into a composite wave by which a carrier wave is modulated.

Having in mind the described character of the video signal waveforms of an elemental multiplex color television system, reference now will be made to Figure 7 of the drawings. The circuit diagram is that of a color television image reproducing system with typical circuit components of the sampling system in accordance with the present invention shown in detail. The composite color television signal which is intercepted by an antenna 94 is impressed upon a television signal receiver 95. It will be understood that this receiver includes conventional apparatus such as a radio frequency amplifier, a frequency converter or first detector, an intermediate frequency amplifier and a second or signal detector.

The signals derived from the output of the receiver 95 are impressed upon each of two channels. The composite video and blanking signals are impressed upon a video signal amplifier 96. The video signal amplifying channel also includes an output or driver stage 97 which is coupled to the amplifier 96 by a keyed clamping circuit 98. It will be understood that the clamping circuit 98 is illustrative only. Any other conventional direct current reinsertion arrangement may be used, if desired. The output of the video driver stage 97 is coupled to the beam intensity control grids of blue, green and red kinescopes 99, 100 and 101 respectively. By means of such a circuit arrangement, it is seen that the complete video signal wave is continuously impressed upon one of the electron beam intensity control electrodes of the electron guns of the three color kinescopes.

The television synchronizing signal is impressed upon conventional synchronizing circuit and deflection generators 102. It will be understood that this apparatus includes means for separating the horizontal and vertical synchronizing pulses and also saw-tooth energy generators for energizing the deflection systems of the kinescopes. Color synchronizing signals, such as disclosed in either the copending application of Evans or that of Barton previously referred to, also are derived from the synchronizing apparatus 102 at the horizontal synchronizing frequency. These signals are impressed upon a sampling frequency oscillator 103 to maintain it in synchronism and proper phase with the received signals. This oscillator may be conventional apparatus for producing a relatively high frequency sine wave. Its essential requirements are that it be stable and also subject to control by means of the color synchronizing signals. Accordingly, it may be substantially identical to the sampling frequency oscillator 65 of the transmitter shown in Figure 6.

The sinusoidal voltage at the sampling frequency derived from the oscillator 103 is impressed upon an amplifier 104 used as a driver for the color keyers. The sinusoidal voltage derived from the output of the driver 104 is impressed without phase displacement upon a blue color keyer 105. This voltage also is impressed upon one terminal of a pair of serially connected delay lines 106 and 107. Each of these lines is effective to produce a delay of substantially 120 electrical degrees at the sampling frequency. At the junction point between the lines 106 and 107 a connection is made to a green color keyer 108. A similar connection is made to a red color keyer 109 at the terminal of the line 107. This line terminal also is connected through a resistor 111 to ground, thereby terminating the lines in their characteristic impedance. In this way, reflections in a reverse direction over the lines are prevented. The green and red keyers 108 and 109 preferably are similar to the blue keyer 105.

The output of the blue color keyer 107 is coupled to the electron gun cathode of the blue kinescope 99. In a similar manner, the output of the green and red keyers 108 and 109 are coupled respectively to the electron gun cathodes of the green and red kinescopes 100 and 101.

The partial color images reproduced upon the luminescent screens of the kinescopes may be combined optically in any desired manner. For example, as shown herein, a pair of suitable dichroic mirrors 112 and 113 may be employed to direct the three color images upon the undersurface of a reflecting member 114 which may be viewed directly. The invention is not limited to this particular type of reproducing apparatus. Single multicolor kinescopes may be used as more fully disclosed hereinafter.

Before describing some of the circuit details of this embodiment of the invention a brief description of its general mode of operation will be given. Normally, the cathodes of the color kinescopes 99, 100 and 101 are biased positively relative to ground so that, irrespective of the video signal voltages impressed upon the control grids thereof, the electron guns are effectively inoperative to produce electron beams. The biasing of these cathodes is overcome in a predetermined sequence which, in the illustrated example, is blue, green and red. Accordingly, at the time that the blue video signal component of the composite wave is impressed upon the kinescope control grids, the biasing of the cathode of the blue kinescope 99 is overcome so that an electron beam is produced to excite the luminescent screen. The magnitude of this excitation is determined by the amplitude of the video signal impressed upon the control grid.

At the next succeeding instant, when the received video signal wave represents the green component of the image, the cathode of the green kinescope 100 is conditioned to render the electron beam effective to excite the luminescent screen. In a similar manner, the cathode of the red kinescope 101 is keyed concurrently with the impression upon the kinescope control grids of that portion of the video signal wave which represents the red color component.

The clamping circuit 98, shown principally as an example, is a keyed clamp of the type covered by U. S. Patent 2,299,945, issued October 27, 1942, to Karl R. Wendt and titled "Direct Current Reinstating Circuit." Briefly, it consists of a storage capacitor 115 connected in series between the output of the video signal amplifier 96 and the driver stage 97. A shunt circuit to ground includes a parallel arrangement of inverted diodes 116 and 117 having respectively in series therewith substantially equal resistors 118 and 119.

Normally, the diodes are non-conducting. Consequently, there is an open circuit between the capacitor 115 and ground. Hence, the capacitor remains charged to whatever potential is last impressed thereon. Periodically, substantially in synchronism with the horizontal synchronizing pulses, a positive pulse such as shown at 121 is impressed upon the anode of the diode 116 by a capacitor 122 coupling the diode to the synchronizing circuit 102. At the same time, a negative impulse such as shown at 123 is impressed upon the cathode of the diode 117 by a capacitor 124 coupling the diode to the synchronizing circuits 102. Keyed in this manner, the diodes are conditioned to provide a low impedance circuit to ground from the capacitor 115 permitting the charge on the capacitor to change in accordance with the video signal information received at that time. This is a well known expedient in television systems for effecting background control or direct current reinsertion. As previously indicated, other types of direct current reinsertion apparatus may be used without materially changing the operation of the system.

The video amplifier driver stage 97 is quite conventional. It consists of an electron tube 125, which, in this case, is a pentode. The control grid 126 is directly coupled to the clamping circuit 98. The screen grid 127 is supplied with a positive potential by means of a resistor 128 connected to a source of positive voltage indicated at +B. The screen grid is bypassed to ground by a capacitor 129. Also, the suppressor grid 131 is grounded. The cathode of the tube is connected to ground through a protective resistor 132. The anode of the tube is coupled to the source of space current indicated at +B through conventional peaking circuits including a coil 133 shunted by a resistor 134, a series resistor 135 and a second coil 136. The output from the video amplifier driver stage 97 is derived from the junction point between the high peaking coil 133 and resistor 135. As shown, this point is coupled to the control grids of the electron guns of the blue, green and red kinescopes 99, 100 and 101.

The sampling frequency driver 104 includes an electron tube 137 which, as shown, may be a pentode. The cathode is connected to ground through a resistor 138 bypassed by a capacitor 139 for self-biasing operation in a well known manner. The sampling frequency voltage derived from the oscillator 103 is impressed upon the control grid 141 by a coupling capacitor 142 with which is associated a grid resistor 143. The screen grid 144 has impressed thereon a suitable positive potential by means of a resistor 145 connected to a voltage source indicated at +B. The screen grid also is bypassed to ground by a capacitor 146. The suppressor grid 147 is conventionally grounded. Space current for the tube is provided by a connection of the anode to the source indicated at +B through a coil 148. A capacitor 149 coupled between the anode of the tube and ground is associated with the coil 148 in order to tune the output circuit of the tube to the frequency of the oscillations derived from the oscillator 103.

The output circuit of the driver 104 is derived from the anode of the tube 137 and is coupled by a capacitor 151 to the color keyers as described. The tube 137 normally is grid-leak biased by means of grid current, which is stored in capacitor 142, leaking off through resistor 143 during the time intervals between successive positive peaks of the sinusoidal voltage derived from the sampling frequency oscillator 103.

Inasmuch as all of the color keyers are similar, the details of the blue color keyer only have been shown. This device includes an electron tube 152 of the pentode type. The sinusoidal sampling voltage is impressed upon the control grid 153 by a coupling capacitor 154, a grid leak resistor 155 and a grid current limiting resistor 156. The cathode of the tube is connected to ground through a self-biasing network including a resistor 157 bypassed by a capacitor 158. The screen grid 159 is connected to a source of positive voltage indicated at +B through a resistor 161 and is bypassed to ground by a capacitor 162. Also, the suppressor grid 163 is grounded. Space current for the tube is derived from the source indicated at +B which is shown connected to the anode of the tube through a series resistor 164 and coil 165. The anode of the tube also is coupled to the cathode of the blue kinescope 99 by a capacitor 166.

The color keyer tubes, such as the tube 152, also are grid-leak biased by drawing grid current on the peaks of the sinusoidal sampling frequency voltage impressed thereon. By suitable choice of circuit parameters, the biasing of the tubes is controlled so that they are made conducting only at the positive peaks of the sampling frequency voltage for time intervals equal substantially to the sampling periods.

Normally, the cathode of the blue kinescope 99 is biased sufficiently positive to completely interrupt the electron beam of this tube. This positive biasing of the kinescope cathode is effected by a circuit which includes a series resistor 167 connecting the kinescope cathode to a tap on a potentiometer 168. The terminals of the potentiometer are connected respectively to the positive voltage source +B and ground. This biasing circuit is bypassed to ground by capacitor 169.

Normally, the tube 152 of the blue color keyer is in a minimum conducting or completely non-conducting state. In such a condition, the positive potential derived from the potentiometer 168 is effective to bias the cathode of the blue kinescope 99 so that the electron beam is completely cut off. In response to a sampling frequency pulse derived from the driver 104, the keying tube 152 becomes conducting. The control voltage developed at the anode of this tube, therefore, is a short negative polarity pulse. When such a pulse is impressed upon the cathode of the blue kinescope 99 by the coupling capacitor 166, the normal positive biasing of the electron gun of this kinescope is overcome. In this manner the electron beam is keyed on to excite the luminescent screen of the kinescope. By suitable adjustment of the circuit parameters, this event may be made to coincide with the impression of the blue video signal upon the intensity control grid of the blue kinescope 99.

In a substantially similar manner the green and red color keyers 108 and 109, respectively, function to control the electron beams of the green and red kinescopes 100 and 101, respectively.

With reference to a feature of this invention which will be described subsequently in conjunction with Figure 8 of the drawings, particular attention should be given to the space current connections for the electron tubes 137 and 152 of the apparatus of Figure 7. It will be understood that similar circuit connections are provided for the green and red color keyers 108 and 109. The anode circuits of all of the electron tubes are connected through relatively low impedance conductors to the positive terminal of the source of space current. By reason of such circuit connections, the apparatus operates substantially in the manner described.

By referring now to Figure 8, there will be described a feature of this invention by which the sampling system may be converted automatically from black and white to color operation and vice versa. The particular feature of this invention by which such a result is achieved is embodied in the color keyers and the tuned amplifier driver stage therefor. Accordingly, there is shown only one of the color keyers and the driver stage. It will be understood that the other color keyers (not shown) will be substantially identical to that shown. The driver stage 104*a* is identical to the driver 104 of Figure 7 except for the screen grid and anode connections of the tube 137. The screen grid 144 is connected to the positive voltage source +B through a resistor 145 as in the form of the invention shown in Figure 7. Similarly, the screen grid 159 of the blue color keyer tube 152 is connected to +B through a resistor 161. It is to be especially noted that each of the screen grids is connected through individual resistors to the source of positive voltage.

The anode of the driver tube 137 is connected through the coil 148 to a common anode bus bar 171. The tuning capacitor 149 is connected, in this case, between the anode of the tube 137 and the positive terminal of the voltage source indicated at +B.

In a like manner, the anode of the blue keyer tube 152 is connected through resistor 164 and the coil 165 to the bus bar 171. The kinescope bias-adjusting bleeder potentiometer 168 also is connected to the common bus bar 171. This bus bar is connected to the positive terminal of the voltage source indicated at +B through a common voltage-dropping resistor 172.

As long as sinusoidal oscillations at the sampling frequency are impressed upon the driver tube 137, this device and the color keyers operate substantially in the manner described. The driver tube 137 and the color keyer tubes such as the tube 152 are grid-leak biased as in the preceding case. The time constants of the grid-biasing circuits are of such a character that suitable negative biasing voltages are maintained at the control grids of the tubes to maintain the tubes non-conducting between the times of impression thereon of the sampling frequency impulses.

Should the sampling frequency oscillations be discontinued for any reason, the grid-biasing facilities for the electron tubes would be ineffective to maintain the tubes nonconducting. Consequently, each of the tubes will draw more space current. Since the total space current for all of the tubes traverses the common resistor 172, it is seen that the result of the additional current conduction of the tubes is to decrease the positive potential of the bus bar 171. It is assumed that the setting of the potentiometer 168 by which the normal cathode biasing voltage for the color kinescopes is adjusted is not changed. Accordingly, it is seen that, as a result of the decreased positive voltage impressed upon the bus bar 171, the positive cathode-biasing of the color kinescopes is reduced. By suitably choosing the value of the resistor 172, the bias on the three kinescope electron guns may be automatically reduced to the value required for black and white unsampled operation. Such a result is produced simply by interrupting the sampling frequency oscillations. The cathode resistors of the electron tubes prevent overloading of the associated tubes when the sampling frequency oscillations are interrupted.

A feature of such a character is useful in designing television receivers for reproducing images either in color from a sampled video signal wave or in black and white from an unsampled video signal wave depending upon the selected channel.

As illustrative of the fact that the invention is not limited to any particular type of image-reproducing apparatus, reference now will be made to Figure 9. The image-reproducing apparatus shown in this figure is a single cathode ray tube capable of reproducing an image in a plurality of component colors. In general, the type of tube shown is that disclosed in greater detail in a copending U. S. application of A. C. Schroeder, Serial No. 730,637, filed February 24, 1947, and titled "Picture Reproducing Apparatus," now Patent No. 2,595,548, granted May 6, 1952.

The cathode ray tube 173 is provided with a plurality of electron guns in order to produce a like plurality of electron beams by which to excite the luminescent screen. If it be assumed that a tube of this type is to be used in a three-color television system, three electron guns will be provided. The three electron guns include cathodes 174, 175 and 176. Associated respectively with these cathodes are beam intensity control grids 177, 178 and 179. It will be understood that, as shown in this figure, the electron guns are merely diagrammatically represented. Actually, as disclosed in the Schroeder application referred to, the three electron guns are mounted symmetrically, at substantially 120 degree angles relative to one another, about the central axis of the tube.

The tube 173 also includes an apertured electrode 181 and a luminescent screen 182. The luminescent screen is made up of a multiplicity of phosphor areas of sub-elemental dimensions. The sub-elemental phosphor areas preferably are arranged in groups of three. Each group is associated with one of the apertures in the electrode 181. The phosphors of the respective sub-elemental areas are capable respectively of producing light of the component image colors when excited by an electron beam. The particular phosphor area which is excited is determined by the angle at which the electron beam traverses the aperture of the electrode 181. This angle, of course, is determined by the particular one of the electron guns which is energized. It is seen, therefore, that to effect the reproduction of an image in its component colors, by means of a tube of this type, it merely is necessary to key the electron guns of the tube in a predetermined sequence and in synchronization with the reception of the correspondingly colored video signal.

Figure 7:
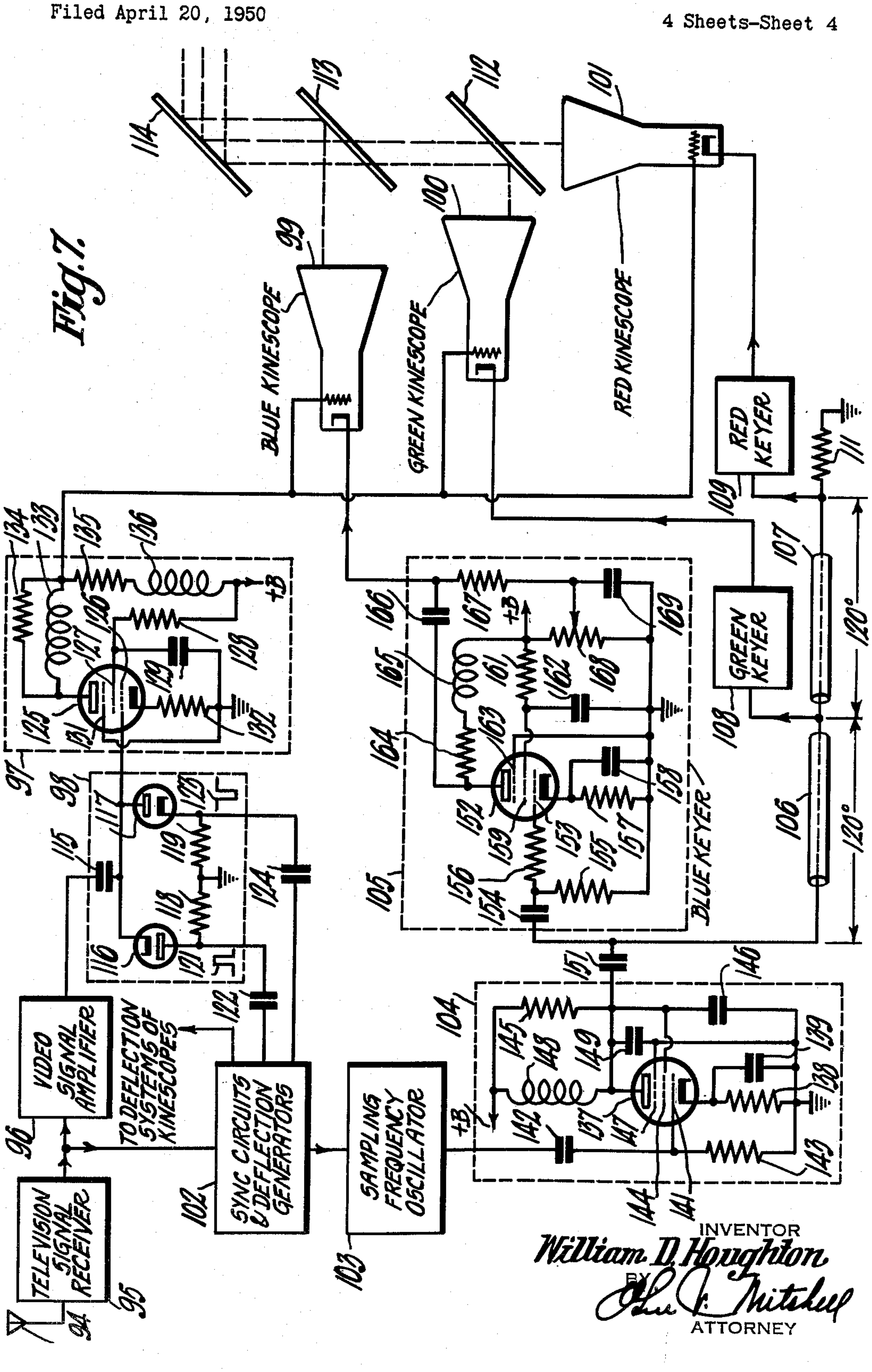
Figure 7 is a circuit diagram of a television receiver showing one embodiment of the improved sampling system of the present invention.

Accordingly, as indicated in this figure, the control grids 177, 178 and 179 are coupled to the video signal channel in substantially the same manner as the control grids of the kinescopes shown in Figure 7 are coupled thereto. By this means the composite video signal wave is continuously impressed upon the control grids of all of the electron guns. The cathodes 174, 175 and 176 of the electron guns are coupled respectively to blue, green and red keyers. These connections may be made in any suitable manner, such as indicated in Figures 7 or 8. In view of the foregoing description of the manner in which the receiving apparatus of Figures 7 and 8 operates, it is considered unnecessary to describe further the operation of the system when using a single multicolor tube such as shown in Figure 9.

It is to be further understood that the present invention may be employed successfully with other multicolor kinescopes provided either with a plurality of electron guns or with a single electron gun. For example, another type of multicolor kinescope with which the invention may be used and which has a plurality of electron guns is disclosed in U. S. Patent 2,481,839, granted to A. N. Goldsmith on September 13, 1949, and titled "Color Television."

A typical example of a multicolor kinescope having a single electron gun with which the present invention may be used is disclosed in U. S. Patent No. 2,446,791 granted to A. C. Schroeder on August 10, 1948, and titled "Color Television Tube." In the kinescope covered by the Schroeder patent referred to, color separation is effected by selectively deflecting a single electron beam over a luminescent screen having the different color-producing phosphors arranged thereon in sub-elemental strips extending substantially the entire width of the screen.

The present invention also is particularly adapted for use with a multicolor kinescope employing a single electron gun of the type disclosed in copending U. S. application of R. R. Law, Serial No. 165,552, filed June 1, 1950, and titled "Color Television." The general principle upon which this tube operates is somewhat similar to that of the apparatus disclosed in the copending Schroeder application referred to. The color reproduction is effected by the angle at which the beam approaches the target electrode. However, instead of having three electron beams, as in the device covered by the Schroeder application, the Law apparatus employs a single electron beam. In order to vary the angle of approach to the electrode, the single electron beam has imparted thereto a spinning type of motion before it is deflected over the luminescent screen. A beam of this type may be keyed so that it is rendered effective at the proper times to approach the target electrode from the angle necessary to produce light of the desired color. The beam keying is made to coincide with the video signal received at that time.

From the foregoing description of an illustrative embodiment of the invention, it may be seen that there is provided an improved time division multiplex system especially adapted for color television. One of the improvements in accordance with this invention is the means for developing the composite video signal wave so that effective cross talk balance is automatically achieved by the relatively simple expedient of properly choosing the width or time duration of the video signal samples. In addition, the sampling circuits at the receiver have been improved by simplification.

The nature of the invention may be determined from the foregoing disclosure of an illustrative embodiment thereof. The scope of the invention is defined in the appended claims.

What is claimed is:

1. A color television system comprising means for generating concurrently individual video signals representative respectively of the component colors of an image, means for deriving discrete samples from said individual video signals in succession, means for converting said discrete signal samples into a composite video signal wave, means controlling the time duration of said signal samples to produce successive instantaneous amplitudes of said composite video signal wave representative respectively of one only of said individual video signals at a time, cathode ray apparatus including a cathode and a grid for reproducing said image in its component colors, means for continuously impressing said received composite video signal wave upon said grid, and means coupled to said cathode to intermittently operate said cathode ray apparatus concurrently with the reception of said instantaneous amplitudes of said composite video signal wave.

2. A color television system comprising means for generating concurrently individual video signals representative respectively of the component colors of an image, means for deriving relatively small discrete samples from said individual video signals in succession, means for converting said discrete signal samples into a composite video signal wave, means controlling the time duration of said video signal samples to produce successive instantaneous amplitudes of said composite video signal wave representative respectively of one only of said video signals at a time, means for transmitting and receiving said composite video signal wave, cathode ray apparatus for reproducing said image in its component colors, electron beam-developing means including a cathode and a control grid, means for continuously impressing said received composite video signal wave upon said control grid, and means coupled to said cathode to key said beam-developing means for operation concurrently with the reception of said instantaneous amplitudes of said composite video signal wave.

3. A color television system comprising means for generating concurrently individual video signals representative respectively of the component colors of an image, means for deriving relatively small discrete samples from said individual video signals in succession, means for converting said discrete signal samples into individual continuous waves, means controlling the time duration of said individual video signal samples to produce maximum amplitudes of each of said waves concurrently with substantially zero amplitudes of the others of said waves, means for transmitting and receiving said waves as a composite video signal wave, cathode ray apparatus for reproducing said image in its component colors, electron beam-developing means including a cathode and a beam intensity control grid, means for continuously impressing said received composite video signal wave upon said control grid, and means coupled to said cathode to key said beam-developing means for operation concurrently with the reception of the maximum amplitudes of said individual video signal waves.

4. In a color television system, apparatus for developing a composite time division multiplex signal wave representative of the color components of successive elemental areas of an image, comprising means for generating concurrently individual video signals representative respectively of the component image colors, sampling means having an output for each of said video signals operative successively at a predetermined video signal sampling frequency for producing samples of said video signals, a low pass filter coupled to the outputs of said sampling means and having a cutoff frequency substantially equal to said sampling frequency, and means coupled to said sampling means to control the operative periods of said sampling means suitably to produce at said filter output a wave for each component image color having a direct current component of such a magnitude relative to the peak-to-peak amplitude that its maximum value occurs substantially simultaneously with the occurrence of zero values of the others of said waves.

5. In a color television system, apparatus for developing a composite time division multiplex signal wave representative of the color components of successive elemental areas of an image, comprising means for generating concurrently individual video signals representative respectively of the component image colors, sampling means having an output for each of said video signals operative successively at 120 degree intervals at a predetermined video signal sampling frequency for producing pulse samples of said video signals, a low pass filter coupled to the outputs of said sampling means and having a cutoff frequency substantially equal to said sampling frequency, and means coupled to said sampling means to control the length of said pulse samples suitably to produce at said filter output a wave for each component image color having a direct current component of such a magnitude relative to the peak-to-peak amplitude that the wave has substantially zero values at 120 and 240 degree intervals after each maximum value.

6. In a color television system, apparatus for developing a composite time division multiplex signal wave representative of the color components of successive elemental areas of an image, comprising means for generating concurrently individual video signals representative respectively of the component image colors, a normally inoperative sampling device for each of said video signals coupled to said signal generating means, means to render said sampling devices momentarily operative successively at 120 degree intervals at a predetermined video signal sampling frequency, a low pass filter coupled to the output circuits of all of said sampling devices and having a cutoff frequency of less than the second harmonic of said sampling frequency, and means to control the length of the operative periods of said sampling devices suitably to produce at said filter output a substantially sinusoidal wave for each component image color having a direct current component of such a magnitude relative to the peak-to-peak amplitude that the wave has substantially zero values at 120 and 240 degree intervals after each maximum value.

7. In a three-color television system, apparatus for developing a composite time division multiplex signal wave representative of three color components of successive elemental areas of an image, comprising means including a television camera tube for each component image color for generating concurrently individual video signals representative respectively of the component image colors, a normally inoperative gating device coupled to each of said camera tubes, a source of control pulses having a predetermined video signal sampling frequency, means coupling said pulse source to said gating devices to render them momentarily operative successively at 120 degree intervals at said sampling frequency, a video signal adder coupled to the output circuits of all of said gating devices, a low pass filter coupled to said adder and having a cutoff frequency only slightly higher than said sampling frequency, and variable biasing means for each of said gating devices to control the length of the operative periods of said gating devices suitably to produce at said filter output a substantially sinusoidal wave for each component image color having a direct current component of such a magnitude relative to the peak-to-peak amplitude that the wave has substantially zero values at 120 and 240 degree intervals after each maximum value.

8. In a three-color television system, apparatus for developing a composite time division multiplex signal wave representative of three primary color components of successive elemental areas of an image, comprising means including a television camera tube for each component image color for generating concurrently individual video signals representative respectively of the component image colors, a normally inoperative gate amplifier coupled to each of said camera tubes, a source of control pulses having a predetermined video signal sampling frequency, means including phase shifting apparatus coupling said pulse source to said gate amplifiers to render them momentarily operative successively at 120 degree intervals at said sampling frequency, a video signal adder coupled to the output circuits of all of said gate amplifiers, a low pass filter coupled to said adder and having a cutoff frequency only slightly higher than said sampling frequency, and a variable biasing circuit for each of said gate amplifiers to control the length of the operative periods of said gate amplifiers suitably to produce at said filter output a substantially sinusoidal wave for each component image color having a direct current component of such a magnitude relative to the peak-to-peak amplitude that the wave has substantially zero values at 120 and 240 degree intervals after each maximum value.

9. A color television reproducing system comprising, a plurality of image-reproducing elements capable respectively of reproducing the different component colors of an image in response to electronic excitation, electron beam-developing means energizable to excite said image-reproducing elements, means continuously impressing upon said beam-developing means a video signal wave having different instantaneous amplitudes representative respectively of the color components of successive elemental areas of an image, means normally impressing a biasing voltage on said beam-developing means to render it inoperative, and means including an electron tube having its anode circuit coupled to said biasing means and to said beam-developing means and operative concurrently with the reception of said different instantaneous video signal amplitudes to overcome momentarily said biasing means, whereby to render said electron beam operative to excite said image-reproducing elements in a predetermined order.

10. A color television reproducing system comprising, a plurality of image-reproducing kinescopes capable respectively of reproducing the different component colors of an image in response to selective electronic excitation, electron beam-developing means for each of said kinescopes including a cathode and a beam intensity control grid energizable to excite said image-reproducing elements, means continuously impressing upon said control grids a video signal wave having different instantaneous amplitudes representative respectively of the color components of successive elemental areas of an image, means normally impressing individual biasing voltages on said cathodes to render said beam-developing means inoperative, an electron keyer tube for each color having its anode circuit coupled to one of said biasing means and to one of said cathodes and operative momentarily to overcome said biasing means, whereby to render said associated electron beam operative, and means including an electron driver tube for all of said color keyer tubes to render said keyer tubes operative in a predetermined order.

11. A color television reproducing system comprising, a plurality of different color kinescopes, an electron gun for each of said kinescopes including a cathode and a beam intensity control grid, means continuously impressing upon said control grids a video signal wave having different instantaneous amplitudes representative respectively of the color components of successive elemental areas of an image, means including a voltage source normally impressing individual biasing voltages on said cathodes to render said electron guns inoperative, an electron keyer tube for each color having its anode circuit coupled to said voltage source and operative momentarily to overcome said biasing means, whereby to render said associated electron beam operative, means including an electron driver tube operative to produce a series of pulses at a frequency equal to the reproduction rate of elemental image areas, and means including a delay network for impressing said impulses upon said color keyer tubes in a predetermined phase relationship to render said keyer tubes operative successively.

12. A color television system comprising, a source of a three-color video signal wave consisting of three individual 120 degree phase displaced sine waves of a predetermined color repetition frequency having respective amplitudes varying in accordance with the different component image colors and respective direct current components of such magnitudes that the amplitudes of any two of said individual sine waves is substantially zero when that of the other wave is maximum, cathode ray apparatus for reproducing an image in its component colors, electron gun apparatus for selectively energizing said cathode ray apparatus to produce said image colors, means including a video signal amplifier coupled to said signal source for continuously impressing said three-color video signal wave upon said electron gun apparatus, a power supply, means coupled to said power supply for biasing said electron gun apparatus normally to an inoperative state, an electron color keyer tube for each of said component image colors coupled to said power supply and operative momentarily to reduce the biasing of said electron gun apparatus to render it operative to develop electron beam energy of an intensity determined by the instantaneous amplitude of the video signal wave, and means operative concurrently with the occurrence of maximum amplitudes of said individual sine waves to operate said color keyer tubes in a predetermined order.

13. A color television system comprising, a source of a three-color video signal wave consisting of three individual 120 degree phase displaced sine waves of a predetermined color repetition frequency having respective amplitudes varying in accordance with the different component image colors and respective direct current components of such magnitudes that the amplitudes of any two of said individual sine waves is substantially zero when that of the other wave is maximum, a kinescope for each of the component image colors, an electron gun for each kinescope including an intensity control grid, means including a single video signal amplifier coupled to said signal source for continuously impressing said three-color video signal wave upon the grids of all of said kinescopes, a source of positive voltage, means coupled to said voltage source for biasing said electron guns normally to inoperative states, an electron color keyer tube for each of said kinescopes coupled to said voltage source and operative momentarily to reduce the biasing of said electron guns to render the respective guns operative to develop electron beams of intensities determined by the amplitude of the video signal wave impressed upon said control grids, and means operative concurrently with the occurrence of maximum amplitudes of said individual sine waves to operate said color keyer tubes in a predetermined order.

14. A color television system comprising, a source of a three-color video signal wave consisting of three individual 120 degree phase displaced sine waves of a predetermined color repetition frequency having respective amplitudes varying in accordance with the different component image colors and respective direct current components of such magnitudes that the amplitudes of any two of said individual sine waves is substantially zero when that of the other wave is maximum, a kinescope for each of the component image colors, an electron gun for each kinescope including a cathode and an intensity control grid, means including a single video signal amplifier coupled to said signal source for continuously impressing said three-color video signal wave upon the grids of all of said kinescopes, a source of positive voltage, means including a potentiometer coupled to said voltage source and to said cathodes for biasing said electron guns normally to inoperative states, an electron color keyer tube for each of said kinescopes, each of said keyer tubes having an output circuit coupled to said voltage source and being operative momentarily to reduce the biasing of said electron guns to render the respective guns operative to develop electron beams of intensities determined by the amplitude of the video signal wave impressed upon said control grids, and means operative concurrently with the occurrence of maximum amplitudes of said individual sine waves to operate said color keyer tubes one at a time in a predetermined order.

15. A color television receiver including, a plural beam image-reproducing means having a plurality of electron beam-developing means, means continuously impressing a video signal wave upon said beam-developing means, said video signal wave having different instantaneous amplitudes at times representative respectively of the light and shade values of a black and white image and at other times representative respectively of the color components of successive elemental areas of a color image, means normally impressing biasing voltages on said beam-developing means to render them inoperative, keyer means operative periodically in response to keying pulses and having output circuits coupled to said biasing means in a manner to overcome said biasing voltages momentarily, said keyer means also having input circuits responsive to said keying pulses in a manner to maintain said keyer means inoperative between keying pulses, and means coupling the output circuits of said keyer means to said biasing means in a manner to overcome said biasing voltages continuously in response to a sustained interruption of said keying pulses.

References Cited in the file of this patent

UNITED STATES PATENTS

| | | |
|---|---|---|
| 2,465,371 | Grieg | Mar. 29, 1949 |
| 2,518,013 | Houghton | Aug. 8, 1950 |
| 2,545,325 | Weimer | Mar. 13, 1951 |
| 2,559,843 | Bedford | July 10, 1951 |
| 2,560,168 | Goldsmith | July 10, 1951 |
| 2,563,406 | Goldberg | Aug. 7, 1951 |
| 2,570,790 | Gray | Oct. 9, 1951 |
| 2,636,937 | Fredendall et al. | Apr. 28, 1953 |